United States Patent [19]
Adams et al.

[11] 3,834,334
[45] Sept. 10, 1974

[54] WORK FEED CONTROL MECHANISM

[75] Inventors: Kenneth D. Adams, Madison; William L. Herron, Elizabeth, both of N.J.

[73] Assignee: The Singer Company, New York, N.Y.

[22] Filed: June 14, 1973

[21] Appl. No.: 370,074

[52] U.S. Cl.............................. 112/210, 112/215
[51] Int. Cl........................................... D05b 27/02
[58] Field of Search........... 112/203, 205, 208, 210, 112/215, 158 R, 158 A, 158 B, 158 C

[56] References Cited
UNITED STATES PATENTS

| | | | |
|---|---|---|---|
| 2,986,107 | 5/1961 | Eriksson | 112/158 A |
| 3,065,716 | 11/1962 | Vigorelli | 112/210 X |
| 3,081,724 | 3/1963 | Bono | 112/158 A |
| 3,108,555 | 10/1963 | Engel | 112/210 X |
| 3,131,658 | 5/1964 | Yanagibayashi et al. | 112/210 X |
| 3,221,573 | 12/1965 | Bono | 112/210 X |
| 3,455,258 | 7/1969 | Kasuga | 112/158 X |
| 3,638,593 | 2/1972 | Vollmar et al. | 112/210 |
| 3,766,871 | 10/1973 | Mastuda et al. | 112/210 |

*Primary Examiner*—Werner H. Schroeder
*Attorney, Agent, or Firm*—Marshall J. Breen; Chester A. Williams, Jr.; Joel Halpern

[57] ABSTRACT

A stitch length and cam feed mode ratio control mechanism for the work feed regulating system of a sewing machine that includes a feed regulator shaft rotatably mounted in the frame of the machine operably connected to a feed dog and adapted to influence movement imparted thereto so as to cause same to transport work transversely across the work supporting bed of the machine by predetermined incremental distances. A feed regulator lever arm is secured to the regulator shaft. A floating link member is carried at one end thereof by an element associated with the cam feed linkage system and is provided at its other end with a pin positionable along said feed regulator lever arm and engageable therewith. Manually operable means are provided for guiding said pin along the feed regulator lever arm for stitch length selection and for simultaneously establishing the proportionate amount of motion transmitted from the feed cam to the regulator shaft, the radius of curvature of the feed regulator lever arm and path of movement of said pin being such as to enable the positioning of the pin along the lever without effecting angular movement of the said lever arm when a portion of the cam is being tracked which dictates a zero stitch length. The cam, while in any position other than the zero position, causes the pin to be urged against the said lever arm so as to rotate same and the regulator shaft by an amount representative of the radial location of the pin along the lever.

7 Claims, 9 Drawing Figures

3,834,334

WORK FEED CONTROL MECHANISM

BACKGROUND OF THE INVENTION

The invention relates to a stitch length and cam feed mode ratio control mechanism for the work feed regulating system of a sewing machine. Such work feed systems are generally of the drop feed type (known also as four motion feeds), the work engaging feed dog being elevated into work engagement during the feed advance or reverse stroke, and dropped out of work engagement during the return stroke. U.S. Pat. No. 3,527,183, issued Sept. 8, 1970, discloses one such feed mechanism and also describes the manner in which the feed regulating or rock shaft is connected to the feed bar which carries the work engaging feed dog.

As disclosed in the aforesaid patent, the rock shaft is provided with a block in which is formed a guide slot. A slide block is positioned to ride within the slot and, in cooperation with a feed advance eccentric mounted on the bed shaft, controls the incremental advance of the feed dog during the work feed stroke. Rotation of the rock shaft determines the angular position of the guide slot and thus of the extent of linear work feed motion transmitted to the feed dog. The rock shaft may be rotated in response to either manual or cam feed control. In cooperation with pattern cams, various decorative patterns may thus be stitched, and a range of stitch lengths may be utilized.

It has heretofore been considered desirable to provide for a single stitch length control, which also serves as a ratio control for the motion transmitted by the feed cams to the feed regulating system and thence to the feed dog, without having to additionally position a selector for either manual or cam controlled feed mode. However, an essential prerequisite of such a unitary control mechanism is the feature of balanced control. Specifically, both forward and reverse work feed advances must be regulated equally. Otherwise, when operating in cam controlled feed mode, the pattern being stitched may be balanced at one point; however, as soon as the stitch length is changed, the pattern becomes unbalanced resulting in a distorted picture.

SUMMARY OF THE INVENTION

It is therefore one object of the present invention to provide a stitch length and ratio control mechanism for the work feed regulating system of a sewing machine in which a single manually operable means is utilized to regulate stitch length for manual and ratio control for cam controlled feed modes and to effectuate balanced feed control when operating in cam feed mode.

It is another object of this invention to provide a work feed control mechanism of the drop feed type for a sewing machine in which a single manual control mans is utilized to regulate stitch length for manual and ratio control for cam controlled feed modes thereby obviating the need for a separate selection of cam or manually controlled feed and by which balance is maintained between forward and reverse stitch lengths.

It is yet another object of the invention to provide a control mechanism of the aforementioned character having a quick reverse feature adapted to override the manual or cam controlled feed modes.

Other objects and advantages of the invention will become readily apparent from the following description thereof.

According to the present invention, there is provided a stitch length and ratio control mechanism for the work feed regulating system of a sewing machine, said machine having a frame and a work-supporting bed carried thereby, a feed regulator shaft being rotatably mounted in said frame operably connected to a feed dog and adapted to influence movement imparted thereto so as to cause same to transport work transversely across said bed by predetermined incremental distances, at least one feed cam being mounted in said frame, a linkage system operatively connecting said cam to said feed regulating shaft, said stitch length and ratio control mechanism comprising an arcuate radially extending feed regulator lever arm secured to said feed regulator shaft and movable angularly therewith, a first element operably associated with said linkage system, a floating link member pivotally supported adjacent one end thereof on said first element, a pin carried adjacent the other end of said floating link member, said pin being positionable along said feed regulator lever arm and engageable therewith, means for guiding said pin to move in a path transversely across said feed regulator lever arm, and manually operable means for selectively shifting said guiding means to move said pin radially along said feed regulator lever arm to thereby simultaneously establish stitch length and the proportionate amount of motion to be transmitted from said feed cam to said feed regulator shaft when operating in the cam mode, the radius of curvature of said feed regulator lever arm at zero stitch length having its center substantially coincident with that of said pivotal support by which said floating link member is supported by said first element when a portion of said cam is being tracked which dictates a zero stitch length.

BRIEF DESCRIPTION OF THE DRAWINGS

In order that the invention may be more fully comprehended, it will now be described, by way of example, with reference to the accompanying drawings in which.

DETAILED DESCRIPTION OF THE INVENTION

Figure 1:
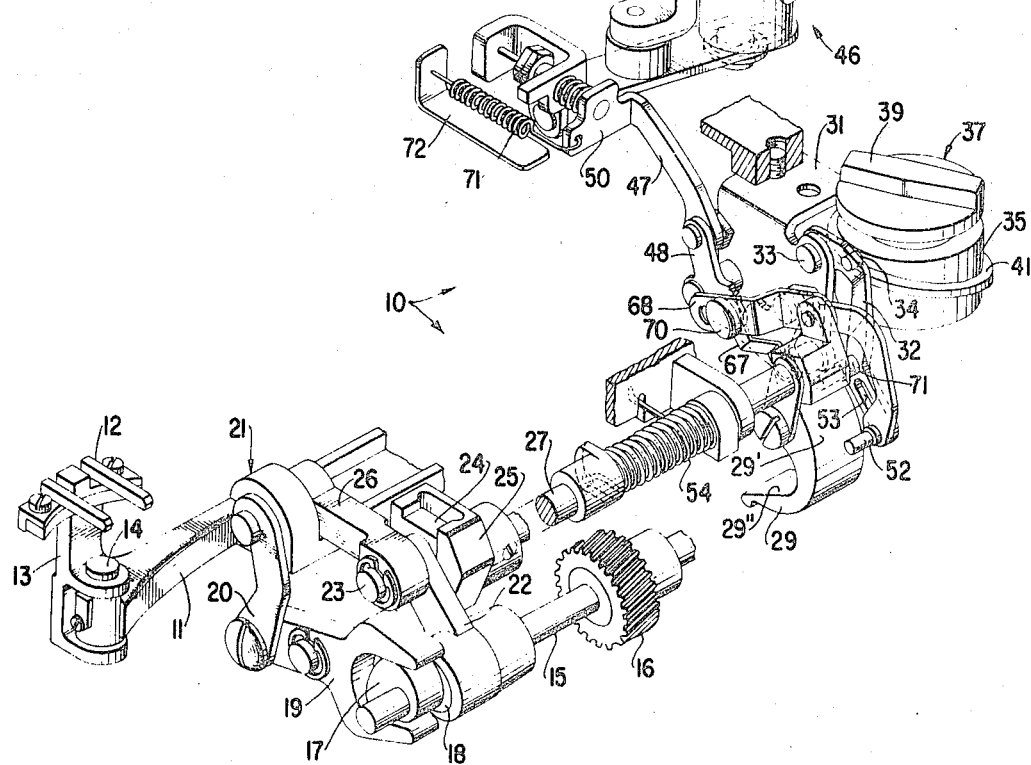
FIG. 1 is a perspective view of a work feed regulating system in which the control mechanism of this invention according to a preferred embodiment has been incorporated.
Figure 2:
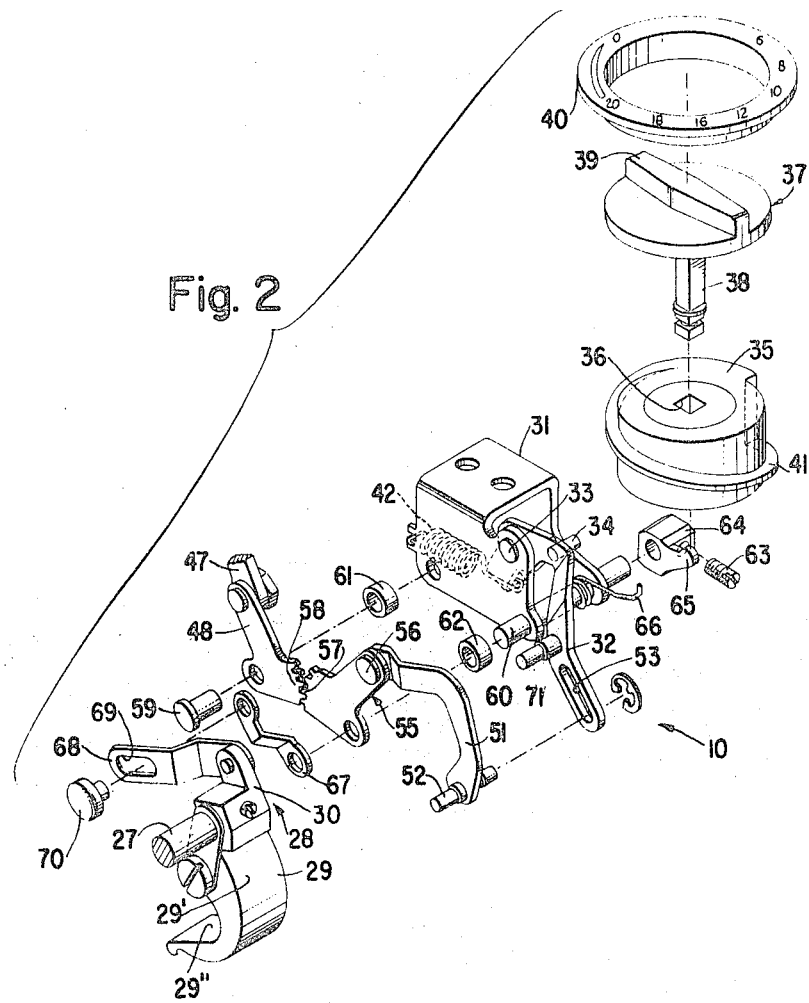
FIG. 2 is an exploded perspective view of the control mechanism shown in FIG. 1.

Referring to FIGS. 1 and 2 of the accompanying drawings, there is seen a work feed control system for a sewing machine indicated generally by reference numeral 10. As is known, for example from U.S. Pat. No. 3,527,183, such a system includes a feed bar 11 mounted pivotally in the bed portion of the machine (not shown) such that it may be oscillated in mutually perpendicular directions so as to impart to the feed dog 12 substantially vertical and horizontal motion. The feed dog is carried by a bracket 13 which is secured to a pivot pin 14 journaled in the feed bar. Bed shaft 15 is journaled in the bed of the machine and is provided with a bevel gear 16 adapted to be driven in synchronism with the actuating mechanism of the machine. Affixed to the bed shaft is a lift cam 17, preferably of the triangular or constant breadth type, and a feed advance eccentric 18. The lift cam imparts vertical motion to the feed bar through bifurcated lever 19, link 20 and a pin and block assembly indicated generally by reference numeral 21. Transverse feed motion is imparted to the feed bar by means of the feed advance eccentric 18, pitman 22, pivot pin 23, slide block 24, feed regulator block 25 and link 26. The aforesaid U.S. Pat. No. 3,527,183 should be referred to for a more detailed discussion of the interrelationship of these elements.

The stich length and ratio control mechanism of this invention is shown in exploded perspective in FIG. 2. A feed regulator shaft 27 is carried in the frame of the machine, preferably in the bed thereof, and carries feed regulator block 25 adjacent one end thereof. A lever assembly 28 is secured to the other end of the regulator shaft. A feed regulator arm 29 with an arcuate, generally radially extending outer surface 29' and a curved inner surface 29'', is an integral and essential component of the lever assembly. As shown, the assembly is provided with a head section 30 which encloses the end of the regulator shaft remote from the regulator block and which surmounts the lever arm 29 for a purpose to be hereinafter described.

A bracket 31 is secured preferably to the bed of the machine and a bell crank 32 is pivotally carried thereby as by pivot pin 33. Affixed to the bell crank at an intermediate location is a cam follower 34. A cylindrical cam 35 is mounted rotatably in the bed of the machine and is provided with a keyway 36 which extends axially therethrough. A manually operable selector dial 37 having a shaft member 38 depending therefrom is carried by said cam. The shaft member is shaped to fit slidably within said keyway 36 and is dimensioned to cooperable therewith in order to impart rotation to the cam upon rotation of the selector dial. The selector dial is also given a handle element 39 for convenient manipulation. A scale member 40 fits snugly over the selector dial into fixed position on the upper surface of the machine bed. The upper face of the scale member is calibrated to define the range of stitch lengths available.

The cam 35 is formed with a generally spiral peripherally extending cam track 41, and a spring member 42 is provided anchored in the machine bed to bias bell crank 32 with an orientation such that cam follower 34 is caused to closely engage the surface of cam track 41. Rotation of the selector dial thus effects a rotation of the cam 35 and a consequent pivotal movement of bell crank 32 about pivot pin 33 through engagement of the follower 34 with cam track 41. The ultimate effect of such pivotal movement of the bell crank is to position pin 52, to be hereinafter described, at a selected radial location along feed regulator lever arm 29 to thus establish a stitch length for manual mode of operation of the machine and the proportionate amount of motion to be transmitted from the feed cam to the feed regulator shaft as will also be hereinafter described.

Referring to FIG. 1, it will be observed that at least one feed cam 43 is mounted rotatably in the frame of the machine. Such cams provide for cam controlled feed mode, a cam follower 44 and a torque bar 45 transmitting the motion through an eccentric balance mechanism in the form of a linkage system indicated generally at 46, lever 47 and link 48. A segment of the control dial 49 for the eccentric balance mechanism is shown. It will be understood that rotation of dial 49 effectuates a corresponding angular movement of the eccentric balance and a consequent shifting of bracket 50 and lever 47. This mechanism is employed, as is known, in order to balance forward and reverse feed in the cam feed mode in order to compensate, for example, for differences encountered in frictional resistances exhibited by different materials. Certain materials offer greater resistance to feed movement in one direction than in the opposite direction. Although the incremental distance traversed by the feed dog in forward feed may be equal to that in reverse feed the fabric may not move equally in both directions; this eccentric balance mechanism enables the operator to compensate for any such differences and to "dial" in the proper balance under particular operating conditions.

A floating link member 51 is supported slidably at one end thereof within a guide slot 53 formed in one arm of bell crank 32 by means of a pin 52 secured to the floating link member. Pin 52 extends from the opposed faces of the floating link member. One such extension of the pin, as previously described, rides within the guide slot 53 formed in bell crank 32. The other extension of the pin is adapted to ride along the surface of lever arm 29. As stated, lever arm 29 is given an arcuate configuration, and pin 52 is positionable along the convex surface thereof. A spring member 54 anchored to the frame of the machine and preferably positioned on the feed regulator shaft 27, biases the shaft in the forward feed advance direction and thus pivots lever arm 29 into firm engagement with pin 52. Further, spring 71 is provided to bias the cam follower 44 towards the cam center. Thus, the diameter of the cam at any point determines the extent to which the follower is permitted to move towards forward — thereby determining the setting of the block 25 and its captive slide block 24 subject to the ratio control established by virtue of the control mechanism of this invention. It will be understood that wherever the expression ratio control is used, it is intended to designate the proportional relationship existing between the amount of motion transmitted by the cam and the ultimate amount of motion imparted to the feed dog in forward or reverse feed.

Floating link member 51 is pivotally carried at its end remote from pin 52 on a lever, comprising an element associated with the cam feed linkage system, which is operably connected to the cam. As shown, the lever is in the form of a second bell crank 55, the floating link 51 being secured thereto by fastening means such as a pivot pin 56. Bell crank 55 is pivotably mounted in the frame of the machine and one arm thereof is provided with a sector gear 57 which is adapted to mesh with a sector gear 58 formed on member 48 which, desirably, is also formed as a bell crank. As seen in FIG. 2 bell crank 55 may be pivotally carried by the bracket 31 which is secured to the frame of the machine. Pivot pin 59, pivot shaft 60 and spacers 61, 62 provide for such pivotal mounting of members 48 and 55 respectively.

The end of pivot shaft 60 remote from bell crank 55 has affixed thereto, such as by a set screw 63, a block 64 having an arm 65 which is positioned directly below the lower terminus of shaft 38. Spring 66 biases shaft 60 such that arm 65 is urged towards engagement with the lower terminus of shaft 38. Also carried fixedly on shaft 60, at the end remote from that to which block 64 is affixed, is one end of a link member 67 having an intermediate offset portion for convenient positioning. The other end of link 67 is slidably carried by slotted lever 68 which is provided with slot 69. Pivot pin 70 extends through slot 69 and is secured to link member 67. Lever 68 is affixed, at the end thereof remote from that in which slot 69 is formed, to head section 30 of lever assembly 28. Thus, depression of the selector dial 37 causes the lower terminus of shaft 38 to engage arm 65 resulting in rotation of pivot shaft 60 and angular movement of link 67 secured thereto. Pin 70 shifts within slot 69 and acts against the innermost surface of the slot to effect movement of slotted lever 68 to turn the lever assembly 28 in a direction such as to shift the lever arm surface 29' away from the pin 52 and to cause the curved inside surface 29'' of the lever arm 29 to move against a stop pin 71 projecting from the bell crank 32, thereby effecting a quick reverse actuation of feed regulator shaft 27. The stitch length obtained by actuation of the quick reverse mechanism, therefore, depends on the forward stitch length setting as reflected in the position of the bell crank 32, and generally, the forward and quick reverse stitch lengths can thus be made to be substantially equal.

Figure 3:
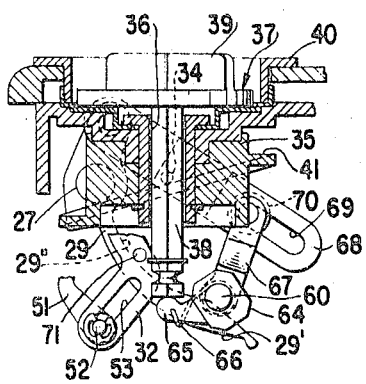
FIG. 3 is a sectional view of the manual stitch length and ratio control selector and associated elements including the quick reverse feature.
Figure 4:
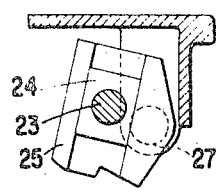
FIG. 4 is an end view of the feed regulating slide block in its position when the quick reverse mechanism is actuated as shown in FIG. 3.

FIGS. 3 and 4 depict the effect of actuating the quick reverse mechanism. As will be observed from FIG. 3, the selector dial 37 has been rotated to an intermediate stitch length position towards the "Fine" portion of the scale. Rotation of the selector dial to such a position resulted in rotation of cam 35 and pivotal movement of bell crank 32, so as to position pin member 52 of link 51 along feed regulator lever arm 29 at a point adjacent the outer end thereof. In such position the slotted lever 68 has been shifted slightly so as to position pin 70 towards the innermost extremity of slot 69. This leads, upon depression of the selector dial and actuation of the quick reverse mechanism, to rotation of regulator shaft 27 to a lesser extent than were the selector dial to be in the larger stitch length setting whereby pin 70 would be located closer to the outermost extremity of slot 69. In this latter position, depression of the selector dial results in rotation of shaft 27 through a greater arc. It will thus be seen that the ratio control mechanism of this invention also serves to regulate the extent of feed advance effected by the quick reverse mechanism through shifting of slotted lever 68 and the repositioning of pin 70 within slot 69. Regulator block 25 is thus positioned such that the guide slot is in an anular orientation. In the setting depicted in FIG. 4, minimal incremental movement of the feed dog is obtained.

Figure 5:
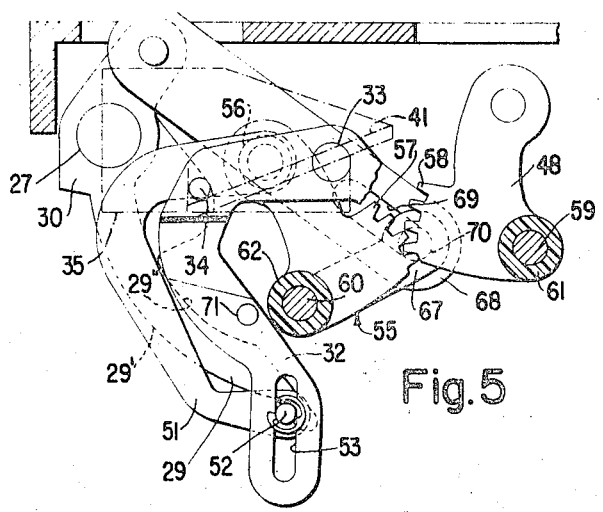
FIG. 5 is a composite view of several elements of the control mechanism of this invention with the manual selector set in zero stitch length.
Figure 6:
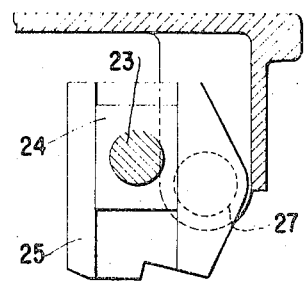
FIG. 6 is an end elevation of the feed regulating slide block and guide slot for the zero stitch length setting shown in FIG. 5.

FIG. 5 illustrates the position of the floating link member 51 and of pin 52 carried thereby in relation to lever arm 29. The selector dial 37 has been rotated to the zero stitch length position. In such position, the floating link member 51 has been rotated, by virtue of the pivotal movement of member 32, so that pin 52 is located at the outermost radial point on lever arm 29. In such position when the machine is balanced the regulator block should be in its vertical orientation whereby no feed advance or reverse is imparted to the feed dog as shown in FIG. 6.

Figure 7:
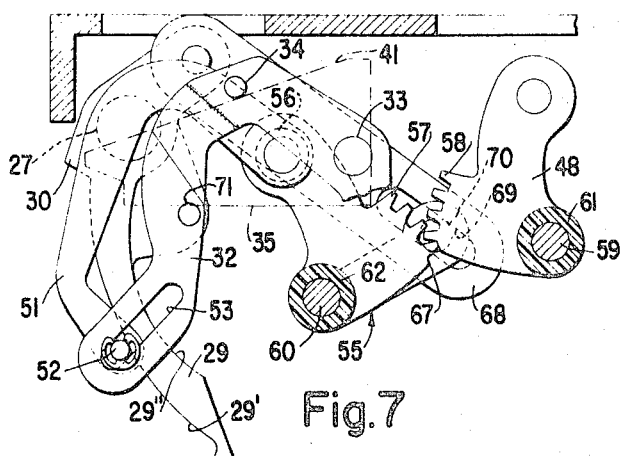
FIG. 7 is a view similar to FIG. 1 in one of the finer stitch length settings.
Figure 8:
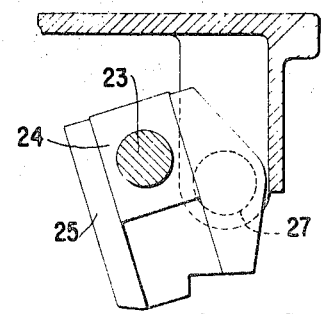
FIG. 8 is an end elevation of the feed regulating slide block and the guide slot in which it is disposed when the feed regulating system is in cam feed mode with the stitch length and ratio control setting shown in FIG. 7.

FIG. 7 illustrates the location of pin 52 along feed regulator lever arm 29 at an intermediate stitch length setting. FIG. 8 indicates the regulator block pivoted to an angular position whereby transverse motion will be imparted to the feed dog. It will be appreciated that manual manipulation of the selector dial 37 enables the operator to set the desired stitch length to be employed in manual feed mode and simultaneously establishes ratio control for operation in the cam feed mode. It merely behooves the operator to place the follower 44 on the desired feed cam without having to additionally utilize a cam feed or manual feed selector. The stitch length control already set for manual feed mode serves also to establish the ratio control for the cam feed mode. Also, by utilizing the unique relationship described for pivotal movement of lever 55, floating link 51 and the guide means 32, the ratio may be increased without having to make any further adjustments to maintain balance in forward and reverse feeds while operating in the cam feed mode. It will be appreciated that although member 32 has been illustrated in the preferred embodiment as a bell crank with a guide slot in one arm thereof, it is within the ambit of the invention to utilize other forms. The primary consideration is that it be so mounted in the frame of the machine that it is adapted to guide pin 52 of link 51 along the radial arcuate outer surface 29' of lever arm 29 to thereby establish stitch length and ratio control, while in cam feed with a portion of the cam being tracked dictating a zero stitch length, such that the radius of curvature of the path of movement of the pin is substantially the same as that of the surface 29'; and that it allows for movement of the pin in a direction substantially normal or transverse to the surface of the lever arm 29 when the floating link is pivoted in response to cam feed control thereby causing pin 52 to engage the lever arm and transmit motion thereto to effectuate forward or reverse feed according to the information on the cam. Lever 55, depicted in its preferred form as a bell crank, should be pivotally mounted such that when a portion of the cam is being tracked which dictates any stitch length other than zero, the angular movement thereof pivots link 51 and urges the pin 52 against the lever arm 29 to rotate same as well as the feed regulator shaft, by an amount representative of the radial location of said pin along said lever arm. Further, the radius of curvature of the lever arm at zero stitch length should have its center substantially coincident with the point at which the link member 51 is pivotally supported by lever 55.

Referring to FIG. 1, as previously stated, spring member 71 is secured to bracket 72 at one end and to lever 47 at its other end, so as to bias the cam linkage system in the forward feed and thus urge follower 44 towards the center of the cam being tracked. The advantages of this arrangement have been heretofore discussed.

Figure 9:
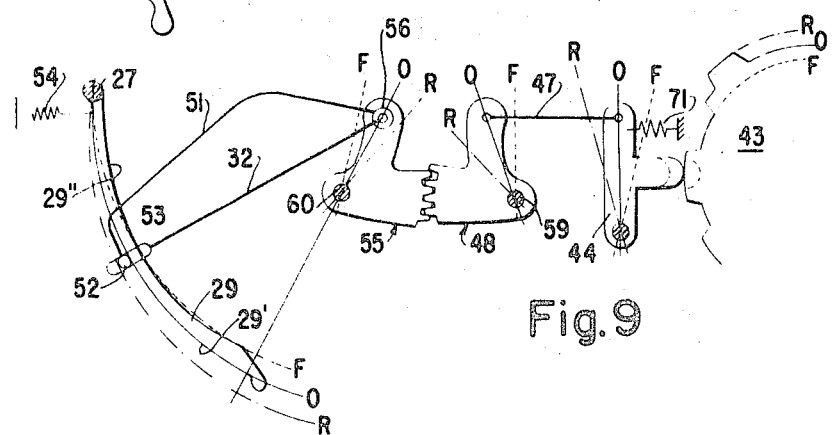
FIG. 9 is essentially a line diagram illustrating the relative positions of elements of the control mechanism in cam feed mode.

FIG. 9 of the drawings illustrates the relative positions of various elements of the control mechanism in forward (F), zero (0) and reverse (R) feed settings and is self-explanatory. It will thus be observed that with a portion of cam 43 being tracked which dictates a zero stitch length, element 55 is moved pivotally so that the pivotal support 56 thereon for member 51 is coincident with the center for the radius of curvature of feed regualtor surface 29'. It will also be seen in FIG. 9 that the axis of turning movement 60 of the element 55 is located a straight line joining the pin 52 when it is adjusted to an extreme position radially outwardly along said feed regulator arm surface 29' and the pivotal support 56 by which the floating link member 51 is supported by element 55 when a portion of cam 43 is being tracked which dictates a zero stitch length. By this arrangement the pattern cam influence is minimized when the ratio control is set at its lowest position so that for all practical purposes, a zero stitch length setting is obtained in this position of parts.

It will be understood that various changes in the details, materials, arrangement of parts, and operating conditions which have been herein described and illustrated in order to explain the nature of the invention, may be made by those skilled in the art within the principles and scope of the invention.

Have thus set forth the nature of this invention, what is claimed here in is:

1. In a sewing machine a stitch length and ratio control mechanism for the work feed regulating system, said machine having a frame and a work-supporting bed carried thereby, a feed regulator shaft being rotatably mounted in said frame operably connected to a feed dog and adapted to influence movement imparted thereto so as to cause same to transport work transversely across said bed by predetermined incremental distances, at least one feed cam being mounted in said frame, and a linkage system operatively connecting said cam to said feed regulator shaft, said stitch length and ratio control mechanism comprising an arcuate radially extending feed regulator lever arm secured to said feed regulator shaft and movable angularly therewith, a first element operably associated with said linkage system, a floating link member pivotally supported adjacent one end thereof on said first element, a pin carried adjacent the other end of said floating link member, said pin being positionable along said feed regulator lever arm and engageable therewith, means for guiding said pin to move in a path transversely across said feed regulator lever arm, and manually operable means for selectively shifting said guiding means to move said pin radially along said feed regulator lever arm to thereby simultaneously establish stitch length and the proportionate amount of motion to be transmitted from said feed cam to said feed regulator shaft when operating in the cam mode, the radius of curvature of said feed regulator lever arm at zero stitch length having its center substantially coincident with that of said pivotal support by which said floating link member is supported by said first element when a portion of said cam is being tracked which dictates a zero stitch length.

2. A machine according to claim 1 wherein said first element operatively associated with said linkage system comprises a lever, means pivotally supporting said lever relative to said sewing machine on an axis which is located substantially along a straight line joining said pin when it is adjusted to an extreme position radially outwardly along said feed regulator lever arm and said pivotal support by which said floating link member is supported by said first element when a portion of said feed cam is being tracked which dictates a zero stitch length.

3. A machine according to claim 1, wherein said manually operable means includes a selector dial coupled to a cylindrical cam member provided with a generally spiral peripheral cam track and said pin guiding means includes a first bell crank pivotally mounted in the frame of said machine, a cam follower being carried by said bell crank cooperable with said cam track to determine the pivotal movement of said bell crank, said bell crank being further provided with a guide slot on one arm thereof dimensioned to slidably receive the pin on said floating link member.

4. A machine according to claim 3, wherein said first element comprises a second bell crank, one arm of said second bell crank having a sector gear formed at the end thereof, said linkage system being operatively connected to said sector gear by means of a cooperable second sector gear, said floating link member being supported by the other arm of said second bell crank.

5. A machine according to claim 3, wherein said selector dial is provided with a depending shaft, said cylindrical cam having an axially extending keyway therethrough, said depending shaft extending slidably but non-rotatably through said keyway and cooperable therewith to impart rotative motion to said cylindrical cam upon rotation of said selector dial, a spring biased pivot shaft being journaled in said machine beneath said depending shaft, a block being affixed to said pivot shaft having an arm integral therewith positioned directly below the lower terminus of said depending shaft and urged towards said shaft, a link member secured at one end thereof to a portion of said pivot shaft remote from said block, the othere end of said link member being connected slidably within a slot formed in a slotted lever, a head section surmounting said feed regulator lever arm secured to said regulator shaft, said slotted lever being affixed to said head section and extending generally radially of said regulator shaft, whereby depression of said selector dial causes the lower terminus of the depending shaft to engage with the said arm on said pivot shaft to effectuate rotation of said shaft, pivotal movement of said link and pivotal movement of said slotted lever about the regulator shaft to thereby rotate said regulator shaft and impart a quick reverse movement to the feed dog.

6. A machine according to claim 5, wherein rotation of said selector dial causes movement of said slotted lever and a repositioning of the slot thereof relative to the end of said link member connected therein.

7. A machine according to claim 1, wherein means are provided for biasing said feed regulator lever arm in the forward feed direction, the pin member on said floating link member being slidable along the convex surface of said feed regulator lever arm.

* * * * *